United States Patent [19]

Mesny et al.

[11] 4,103,869
[45] Aug. 1, 1978

[54] VEHICLE LEVELLING AND STABILIZING SYSTEM

[76] Inventors: Philip R. Mesny, 20233 Parthenia, Canoga Park, Calif. 91306; Jake E. Peoples, 5034 Cahuenga Blvd., North Hollywood, Calif. 91601

[21] Appl. No.: 854,934

[22] Filed: Nov. 25, 1977

Related U.S. Application Data

[63] Continuation of Ser. No. 759,319, Jan. 13, 1977, abandoned.

[51] Int. Cl.² ............................................. B66F 7/24
[52] U.S. Cl. ................................................ 254/86 R
[58] Field of Search ............... 254/45, 86 R; 280/764

[56] References Cited

U.S. PATENT DOCUMENTS

| 2,001,411 | 5/1935 | Davis | 254/86 R |
|---|---|---|---|
| 2,817,493 | 12/1957 | Belcher | 254/86 R |
| 3,164,275 | 1/1965 | Schatzl et al. | 254/45 |
| 3,523,698 | 8/1970 | Bishop | 254/45 |
| 3,669,409 | 6/1972 | Eranosian | 254/45 |
| 3,854,750 | 12/1974 | Voehringer | 254/86 R |
| 3,885,813 | 6/1975 | Kern | 254/45 |

*Primary Examiner*—Robert C. Watson
*Attorney, Agent, or Firm*—Warren T. Jessup

[57] ABSTRACT

A vehicle levelling and stabilizing system for campers, trailers and the like, which is easily attachable to existing vehicles. The system is comprised of a plurality of horizontal folding jacks which can be attached at strategic locations to a trailer. Each jack has an electrically operated gear motor for extending and retracting the leg of the jack. The gear motor assembly is attached to the jack by a motor mount configured to permit the gear motor to be secured at a variety of angles to adapt the system to most trailers. The motors are driven by a switching system which allows selection of one or more of the jacks to produce levelling of the trailer. A suitable level is provided either on the tongue of the trailer or at a convenient location. As an alternative, an automatic levelling system may be provided in which a pendulum system operates the jacks successively until the trailer is level.

4 Claims, 6 Drawing Figures

VEHICLE LEVELLING AND STABILIZING SYSTEM

This application is a continuation of application Ser. No. 759,319, filed Jan. 13, 1977 now abandoned.

BACKGROUND OF THE INVENTION

This invention relates generally to levelling systems for vehicles, and more particularly relates to a levelling system for campers, trailers and the like.

Jack systems for raising and levelling vehicles, such as trailers, campers and the like have come into use for a variety of reasons. With the advent of the truck camper, the jack systems are used to support the camper when it is not attached to the truck bed and are also frequently used to stabilize the camper from tilting and swaying, as well as to level them even when attached to the truck bed. With trailers, various means have been used in the past to stabilize them, such as placing bricks under the corners and later utilizing jacks to firmly support the trailer in a stabilized and level position. Trailers were at one time levelled by jacking up one or more corners and placing bricks, boards or other objects under the wheels or the trailer itself. Subsequently systems were designed which were automatically operated either electrically or hydraulically to raise one or more corners of the trailer to level and stabilize it. Among these systems are built-in vertical jacks used to stabilize the trailer and including an automatic switching system which automatically operates diagonal jacks until the trailer was level and stable. Another system used a scissors-type jack attached to each corner or thereabout on trailers and has a pendulum-operated switching system to operate one or more jacks in an electrohydraulic fashion. The problem with these two systems is the need for either complex electrical and hydraulic systems or the installation of the jacks on the frame before building or attaching the trailer.

The present invention solves the need for adapting jacks to all the existing trailers and campers which do not have them built in. For this reason the jack system of the present invention provides a compact, easily attachable jack system which can be accommodated to most trailers and campers.

SUMMARY OF THE INVENTION

The purpose of this invention is to provide a jack system for trailers, campers and the like which can be adapted to existing campers or built into new vehicles. The system utilizes simple, horizontal channel beam, folding jacks which can be placed in a variety of positions allowing the jack to be accommodated to most trailers. The folding of the jack to a compact closed position permits the jack to be installed with very little clearance necessary and only a small amount of space required. The jacks have a horizontal worm screw in a channel beam to which a gear motor is attached through a hex shaft and to drive the extendable leg of the jack. Each jack may be operated independently with a separate switch or may be simultaneously operated with an automatic levelling system. The switching system for manual operation of the jacks provides a rotary switch which operates all the jacks simultaneously until at least one is in contact with the surface or ground. Each jack may then be independently selected, while viewing a level mounted on the tongue of the trailer or some other convenient place, until the trailer is stabilized and level. The jack system is primarily for levelling and stabilizing but can be used for performing any mechanical work which requires raising the trailer.

The system may also be operated by an automatic levelling system which utilizes a pendulum switch to operate each jack independently until the system is substantially level. This is done by first switching the system to extend all jacks until they are in contact with the ground and then switching to automatic with the pendulum switch operating jacks successively until a level condition is reached. With this system the trailer may be automatically levelled and stabilized from inside the trailer during periods of inclement weather or without the necessity for viewing a level.

In addition to the manual switch operated system and the automatic system, the jacking system provides for manual override in the event that one or more of the electrical motors for driving the jacks becomes inoperative or the electrical source is unavailable.

It is one object of the present invention to provide an automatic levelling system which is readily attachable to existing trailers without modifications to the trailer.

Another object of the present invention is to utilize a trailer levelling system which has compact jacks which are easy to operate.

Another object of the present invention is to provide a trailer levelling system in which the system may be operated manually or automatically.

Still another object of the present invention is to provide a trailer levelling system having a gear motor drive system to accommodate a variety of trailers, at very nominal cost.

Other objects, advantages and novel features of the invention will become apparent from the following detailed description of the invention when considered in conjunction with the accompanying drawings wherein like reference numbers identify like parts throughout.

DETAILED DESCRIPTION OF THE PREFERRED EMBODIMENT

Figure 1:
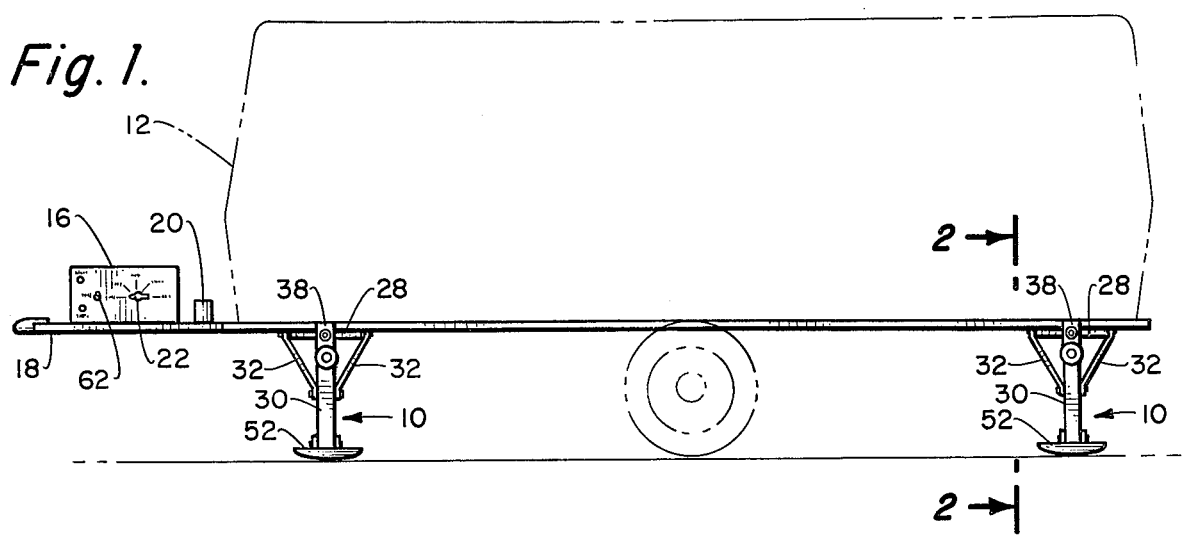
FIG. 1 is a view of the levelling system of the invention as it would be installed on a trailer.

As can be seen in FIG. 1, the jacks 10 are attached near the corners of a trailer 12 for levelling and stabilizing the trailer. In most cases a minimum of four jacks would be needed to level the trailer. In some cases it might be desirable to use more for large trailers. The switching system 16 for the levelling system may be mounted on the tongue 18 of the trailer and a suitable level 20 also mounted where it can be easily viewed. In operation a rotary switch 22 selects various jacks for operation or may operate all four jacks either up or down as will be more clearly described hereinafter with respect to the schematic diagrams.

Figure 2:
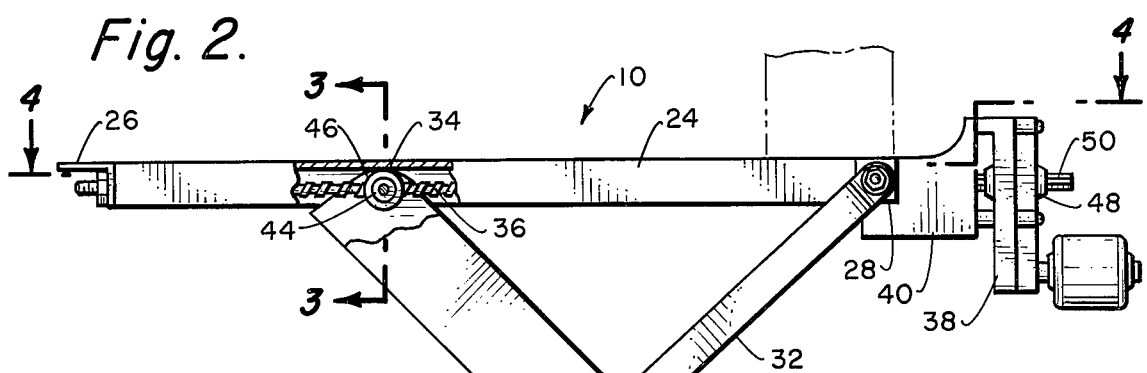
FIG. 2 is a detailed view of the individual jacks of the levelling system.
Figure 3:
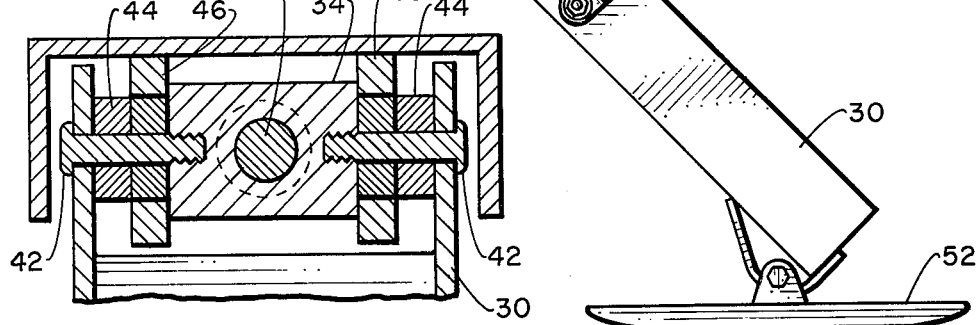
FIG. 3 is a sectional view of the jack taken at 3—3 of FIG. 2.
Figure 4:
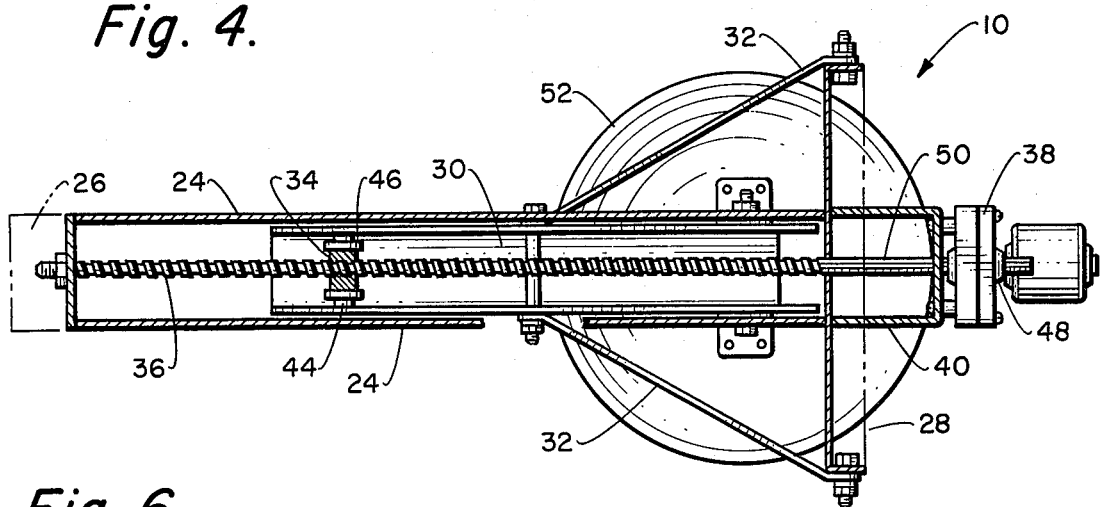
FIG. 4 is a view of the jack used in the system taken at 4—4 of FIG. 2.

The individual jacks 10 for the levelling system are illustrated in FIGS. 2, 3 and 4. In FIG. 2 the jack is comprised of a channel beam 24 which has a mounting tongue 26 on one end and a cross-brace 28 mounted at the opposite end. The jack is provided with an extendable leg 30 connected to the cross-brace 28 by support arms 32. The leg 30 is driven by a trunnion 34 which rides on a worm gear 36 supported in the channel beam 24. The worm gear 36 is driven by a gear motor assembly 38 attached to the jack by a motor mount 40 secured to the cross-brace 28. Many suitable gear-motor assemblies for driving a square, hex or clamped shaft are readily available.

The trunnion arrangement is shown in the partial section of FIG. 3 in which the trunnion 34 is threaded on the worm gear 36 and secured to the leg 30 with bolts 42 passing through a bushing 44 and guides 46. As the trunnion moves along the worm gear 36, the rollers or guides 46 and bushings 44 provide smooth operation to prevent binding or warping during extension or retraction of the leg.

The gear motor 38 is attached to a square hole pattern on the face of the motor mount 40. This permits the gear motor to be mounted in any of four positions allowing clearance for various trailer designs. The gear motor 38, when secured to the motor mount 40, has a socket 48 engaging a hex shaft or bar 50 attached to the worm gear 36. The hex bar 50 secured to the end of the worm gear 36 extends an inch or so beyond the end of the socket 48 of the gear motor 38 to allow for manual operation of the jack in the event that a motor does not operate or there is no source of electrical power.

In operation the worm screw 36 is driven in either direction which in turn moves the trunnion to the right or left of 34, either extending or retracting the leg 30. A large dish-shaped foot pad 52 is attached to the end of the leg 30 to equally distribute the weight of pressure. When the leg 30 is completely retracted, it fits neatly into the channel beam 24 providing a very low profile which minimizes the potential for damage due to being hit by objects. Further, this low profile allows the jack to be attached at a number of positions permitting the system to be accommodated to almost any trailer or camper or other structure. An important consideration in the development of this system was the intent to keep it uncomplicated, easy to attach, and readily adaptable to almost any vehicle.

Figure 5:
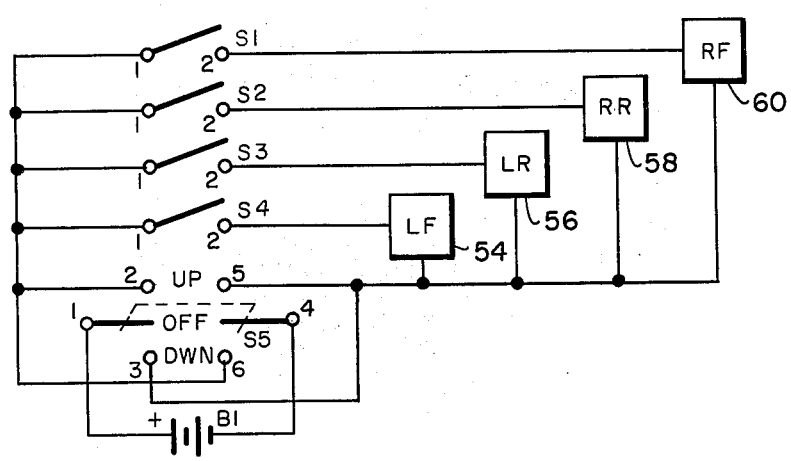
FIG. 5 is a schematic diagram of the manual switching system for operating the jacks.

The system may be manually operated by individually operated switches shown in the schematic of FIG. 5. This schematic illustrates the operation of a four-jack system in which the four jacks 54, 56, 58 and 60 are operated by the switching system of S1 through S5. The switch S5 is a double-pole, double-throw, center-off switch which reverses the battery current on each gear motor and jack system 54 through 60. With switch S5 in the up position (i.e. terminals 2 and 5 connected) power is applied through switch S5 to terminals 1 of switches S1 through S4. Now if switch S1, which is a single-pole, single-throw switch is operated, then jack 60 labelled RF or right front is operated, retracting that jack. Likewise, switches S2 through S4 operate the left front, left rear and right rear jack and gear motor assemblies. With switch S5 in the down position, the battery is reversed, with the negative terminal now being applied to terminals 1 of switches S1 through S4, causing the respective jack and gear motor assemblies to be operated in the reverse direction.

Figure 6:
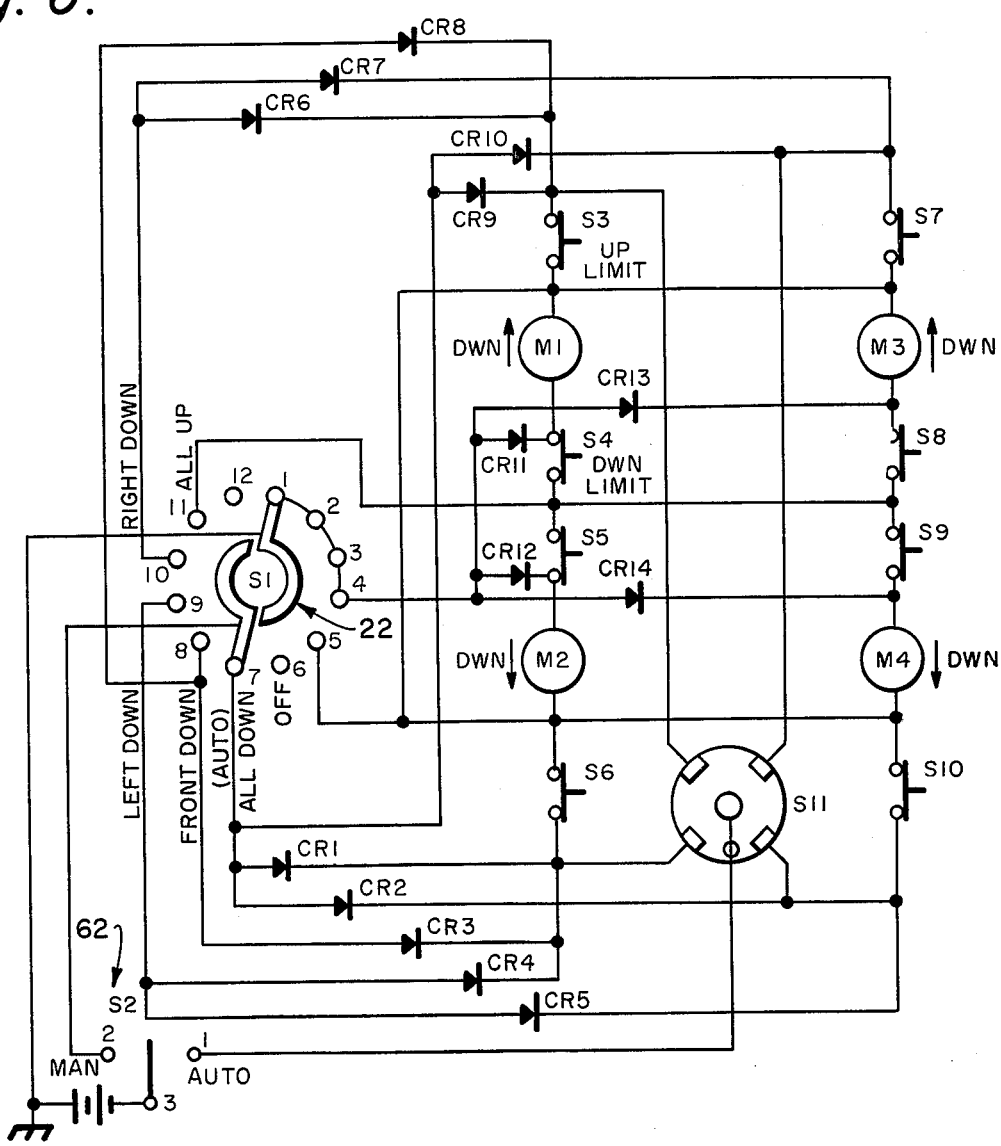
FIG. 6 is a schematic diagram of an automatic levelling system.

An automatic levelling system is illustrated in FIG. 6. A single-pole, double-throw switch S2 would provide selection for manual or automatic operation. With this switch, the operator could select manual operation of switch S1 or automatic operation by selecting the pendulum switch S11. The pendulum switch would be of standard design with the design being such that the pendulum cannot operate more than one jack and gear motor system at a time. The gear motor and jack assemblies are represented by the motors M1, M2, M3 and M4. When switch S2 is in the automatic position, rotary switch S1 would be in the position shown with pins 1 and 7 connected. With switch S2 in the manual position, rotary switch connecting pins 1 and 7 will operate all motors and related jacks simultaneously. The jacks will be operated because terminals 1 through 4 of the rotary switch are all shorted together and connected to the motor assemblies through diodes CR11, CR12, CR13 and CR14. As a reference for the down operation, current flow is indicated by the arrows and the abbreviation "DWN" next to each motor M1 through M4. Of course, in order to prevent damage to the gear motor and jack assembly, limit switches S3-S10 would be provided at suitable locations, either in the channel beam 24 or on the leg 30, which would disable a motor when the leg reaches the limit of its extension in the down travel or the limit of its retraction when fully retracted. These switches S3-S10 are normally closed and are operated to shut off the motor when it reaches its up or down limit.

When the rotary switch S1 is switched to terminals 2 and 8, the battery is then connected through terminals 8 through diodes CR3 and CR8 to extend the jacks connected to motors M1 and M2. Likewise, successive switching of rotary switch S1 selects left down, right down, or all up. The position 6 and 12 of the rotary switch is a complete disabling of the system.

The switch 22 (S1) is shown on the switching system of 16 in FIG. 1. The switch, starting with the first position pointing to the left, would be equivalent to the all down or automatic position. The successive positions as you would rotate the rotary switch clockwise would be front down, left down, right down, and all up, with an off position being provided, if desired. The switch 62 corresponds to the manual automatic switch S2 with up being the manual position and down being the automatic position with a center off position being provided, if desired. Alternatively, the terminals 6 and 12 of the rotary switch could be used as a rear down position for convenience.

With the system shown in FIG. 6 in the automatic position, the pendulum switch S11 will automatically take over and level the system when the switch S1 (22) is in the automatic position as shown. Thus, when you switch to the automatic position, the pendulum switch will tip to either one of the terminals 1 through 4, energizing that particular motor and jack assembly. For example, if the pendulum swings to terminal 1, then motor M1 would be operated through terminal 1 diode CR11, through the limit switch to terminal 1 on the pendulum switch S11 to ground, which is terminal 3 of switch S2.

The pendulum switch S11 can be varied in construction in a number of ways. The pendulum can be large enough and in close enough proximity to the terminals 1 through 4 to be very sensitive, if desired. Further, the terminals and pendulum can be constructed such that under certain conditions it would energize two motor jack assemblies simultaneously. These particular design features are well within the teachings of the invention disclosed herein.

Obviously, many modifications and variations of the present invention are possible in light of the above teachings. It is therefore to be understood that the full scope of the invention is not limited to the details disclosed herein and may be practiced otherwise than as specifically described.

We claim:

1. A levelling and stabilizing jack system for retrofitting to vehicles such as campers, trailers and the like comprising:

a plurality of separately mounted, reversible, horizontal folding jacks with extendable and retractable jack legs mounted at strategic locations on said vehicle, said jacks comprising:

an elongate channel, a worm gear traversing the length of said channel, an elongate jack leg swingable from a position parallel with said channel to a substantially vertical position, a trunnion connecting said leg to said worm gear having bushings between the trunnion and said leg for preventing said trunnion from binding on said worm gear, a hexagonal shaft attached to said worm gear and extending beyond one end of said channel means, a gear box engaging the end of said hexagonal shaft, an electric motor for connecting to a vehicle battery for driving said worm gear, a symmetrical reversible gear box motor mount attached to said channel means for adapting said motor and gear box arrangement so that said jack system may be adapted to mount at a variety of locations on said vehicle, selective means for selectively operating said jacks individually or in predetermined groups or pairs, means for securing said plurality of jack systems at convenient locations on said vehicle.

2. The levelling system according to claim 1 wherein said hexagonal shaft extends beyond said gear box whereby each of said jacks may be operated manually in the event of an electrical failure.

3. The levelling system according to claim 1 wherein said plurality of jacks comprises:

at least four jacks attached to the trailer in the vicinity of the corners, and said selective means includes means for selectively operating each jack individually or in predetermined groups or pairs or all jacks automatically.

4. The levelling system according to claim 1 wherein said selective means includes:

a rotary switch for selectively operating said jacks individually or in preselected pairs, a pendulum switch for automatically and sequentially operating said jacks until said vehcile is level, said rotary switch having an automatic position for selecting said pendulum switch, whereby said jacks may be selectively extended until they contact the ground and then switch to automatic to complete the levelling process.

* * * * *